May 18, 1937.  E. J. DELAHANTY  2,080,702
WHEEL SUSPENSION
Filed Dec. 9, 1933

INVENTOR
EDWARD J. DELAHANTY.
BY
ATTORNEYS

Patented May 18, 1937

2,080,702

UNITED STATES PATENT OFFICE 2,080,702

WHEEL SUSPENSION

Edward J. Delahanty, Detroit, Mich., assignor to Chrysler Corporation, Detroit, Mich., a corporation of Delaware Application December 9, 1933, Serial No. 701,684

3 Claims. (Cl. 280—124)

This invention relates to wheel suspensions for vehicles and refers more particularly to so-called independent wheel suspensions for motor vehicles.

In suspensions of the type mentioned above, it is important to provide a predetermined desired wheel alignment, and in connection with the steering wheels it is particularly desirable to maintain accuracy in the mounting of such wheels to provide the desired degree of camber. Failure to maintain the aforesaid characteristics may, and often does, result in excessive tire wear, difficult steering, shimmy or tramp of the steering wheels, and other undesirable effects.

In actual production, difficulty has been experienced in maintaining the aforesaid characteristics in keeping with practical limitations of cost, workmanship, manufacturing tolerances, and the like.

It is an object of my invention to overcome the aforesaid undesirable effects and difficulties.

A further object of my invention resides in the provision of an improved wheel suspension particularly adapted for manufacture at relatively low cost.

A still further object of my invention resides in the provision of an improved wheel suspension capable of manufacture in keeping with ordinary practical limitations of manufacturing tolerances.

In carrying out the objects of my invention, I preferably provide suitable means in the wheel suspension mechanism for conveniently and accurately compensating for any inaccuracies introduced in the manufacture and assembly of the parts thereof. Thus, by reason of my novel compensating means, any inaccuracies in wheel alignment or camber may be readily corrected.

Further objects and advantages of my invention will be apparent from the following detailed description of my invention, reference being had to the accompanying drawing, in which I have shown several forms which my invention may assume by way of example and illustration.

In the drawing, in which like reference characters represent corresponding parts throughout the several views, Fig. 1 is a front elevational view of the forward vehicle steering wheels showing my improved suspension mechanism therefor.

Figure 1:
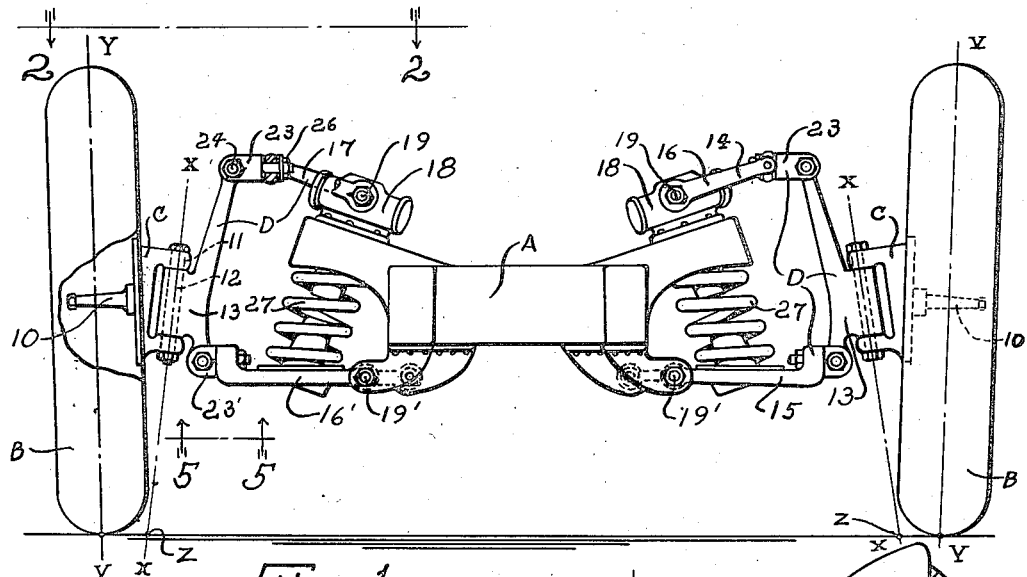

In the drawing, reference character A represents the frame or load carrying structure of the motor vehicle, the body, engine and driving parts of the motor vehicle being largely omitted for clarity in my disclosure since such parts are well known in the art and may be of any desired form and arrangement.

In Figs. 1 to 5 I have illustrated my invention in connection with the forward steering ground wheels B of the motor vehicle, each wheel being journaled on a spindle 10 of the wheel supporting means C. This wheel supporting means of each of the wheels B is also preferably formed with yoked bearings 11 for receiving a king pin 12 providing swiveling of the steering wheel about the axis $x$—$x$ of the king pin or steering knuckle pivot.

As the parts associated with each of the wheels B are similar, the description, for the most part, will be limited to one of the wheels and parts associated therewith.

The wheels B, in their normal positions, illustrated in Fig. 1, are preferably cambered so that the plane Y—Y of each wheel extends upwardly and outwardly at an inclination to the vertical. The desirability of camber for steering wheels is generally accepted and understood and when axis $x$—$x$ lies along the intersection of plane Y—Y with the ground, then the traction resistance of the wheel has no effective lever arm. It is generally desirable to arrange the king pin so that its axis $x$—$x$ intersects the ground a small distance inside plane Y—Y, as represented by the point Z in Fig. 1, in order to provide a lever arm tending to restore the wheel to its straight ahead position.

In order to support the frame structure A by the wheels B and to provide substantially independent suspension or springing movement of each of the wheels B relative to each other, I have provided the connecting means D intermediate the frame and the wheel supporting means C. This connecting means includes an arm 13 associated with each of the wheels B, each arm being adapted to support or carry a king pin 12 between the spaced yoke bearing portions 11 of the wheel supporting means C.

Arm 13 extends generally vertically in the sense that the ends thereof are positioned in spaced relation, the connecting means D, in the illustrated embodiments of my invention being arranged in a substantially trapezoidal shape. Thus, during a displacement of the wheel, the track between wheels B remains practically unchanged when either wheel strikes a depression or encounters a bump in the roadway. The linkage or connecting means D, while of the general parallelogram type, is preferably arranged in the form of a rectangle and more particularly in the form of a trapezoid defined by various supports for the linkage parts.

Extending generally laterally or transversely of the vehicle, are the upper and lower linkages or connectors 14 and 15, respectively. Where the aforesaid trapezoidal arrangement of linkage is desired, connector 15 is somewhat longer than connector 14, as illustrated, this arrangement deviating somewhat from a true parallelogram so as to provide substantially vertically guided movement of the point of wheel tread contact with the ground, on displacement of the wheel. Connector 14 is shown having substantially a wishbone or V-shape, the arms 16 and 17 thereof diverging toward frame A for pivotal connection therewith. With this in view, the frame structure A may rigidly support a shock absorber 18 of any suitable type having an oscillating actuating shaft or pivot pin 19 to which the ends of arms 16 and 17 are connected. Thus, shaft 19 forms the pivotal support for the arms of connector 14 and, if desired, such shaft may be supported directly by the frame structure. The shock absorber, in effect, constitutes a frame bracket for the pivot pin 19.

For convenience of manufacture and assembly, arm 16 may be assembled to arm 17 by fastener 20, the resulting wishbone providing a rigid linkage. At the outer end of connector 14 substantially at the intersection of arms 16 and 17, the connector is formed with an opening 21 therethrough receiving the pin 22 of the adjustable member 23 of the connector 14. This adjustable member is forked to receive the threaded pin 24 which lies transversely with respect to the pin 22. This pin 24 pivotally supports the upper end of arm 13 between the forks of the adjustable member 23. Interposed at opposite sides of the connector 14, according to Figs. 2 and 3, I have located one or more shims or spacers 25, these groups of shims engaging the member 23 and a nut 26 threadedly engaging the end of pin 22 to secure the parts of the connector 14 together as an adjustable assembly. The purpose of the adjustable member and shims will be hereinafter more apparent. By reason of the pivot pins 19 and 24, the connector 14 may pivotally swing with respect to frame A and arm 13 in guiding the wheel when displacement thereof occurs as aforesaid.

Figures 2, 3:
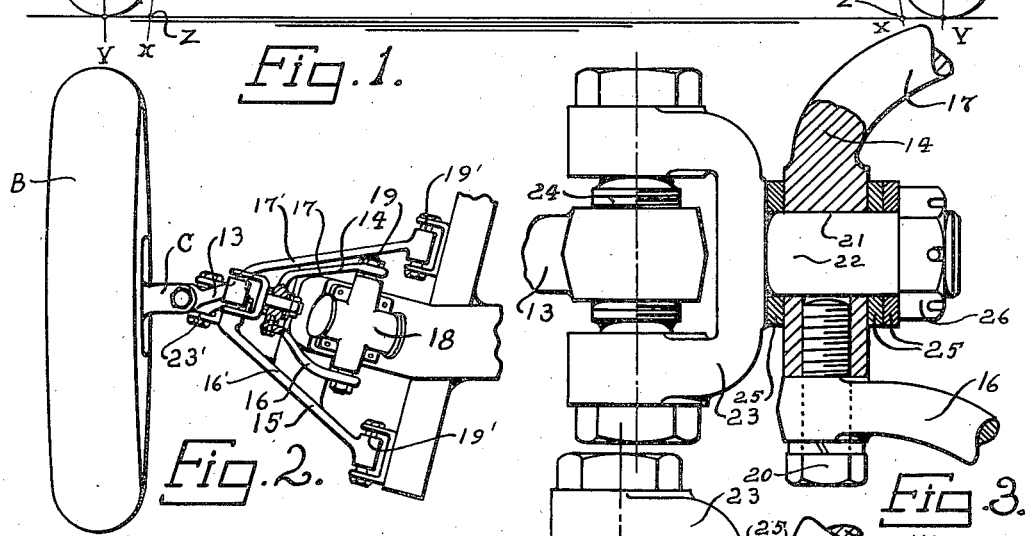
Fig. 2 is an enlarged plan view showing the suspension mechanism for one of the wheels of Fig. 1.
Fig. 3 is a detail plan view of the upper connector illustrating my adjusting means.

Connector 15 is illustrated as the wishbone type generally similar in form with the upper connector 14. Thus, the lower connector 15 is, likewise, formed with arms 16' and 17' which, although somewhat longer than the corresponding arms 16 and 17 of connector 14, diverge toward the frame A in generally similar manner for pivotal connection therewith by reason of the pivot pins 19'. The connector 15 is likewise provided with an adjustable forked member 23' having a pin 22' with associated nut 26'. In Fig. 2 the adjustable member 23' is illustrated without adjusting shims associated therewith, while in Fig. 5, this same member is provided with shims 25' in a manner similar to the shims 25 associated with the adjustable member 23 of Fig. 2.

Connector 15 also has a pivot pin 24' for pivotally receiving the lower end of arm 13. Connectors or linkages 14 and 15 cooperate with arm 13 to impart the desired guided movement to the wheel on displacement thereof.

The vehicle frame structure A and the load carried thereby is yieldingly supported by the wheel supporting means C and connecting means D by reason of suitable springs illustrated at 27 intermediate the frame structure and lower connector 15. If desired, other forms of connectors and springing means may be provided and it is not my intention to limit my invention, in its broader aspects, to the particular form and arrangement of such parts as shown for purposes of illustration.

From the foregoing reference to the desirable characteristics of wheel geometry, it follows that, prior to the teachings of my invention, it would be necessary to maintain, at undesirably high cost, an unusually high degree of machining tolerances and skill in assembly and general workmanship, if these desirable characteristics are to be obtained with the desired degree of precision in the production of motor vehicles. These objectionable factors are most pronounced in the so-called independently sprung wheels to which class my invention particularly relates. My invention will compensate for inaccuracies in the various parts of the linkage forming a wheel suspension mechanism.

In overcoming the aforesaid difficulties and expense, I have provided means for adjusting the normal position of any ground wheel whereby to conveniently and accurately compensate for errors introduced during the manufacturing and assembly processes, as well as during the life of the motor vehicle from a service adjustment standpoint.

Figures 4, 5:
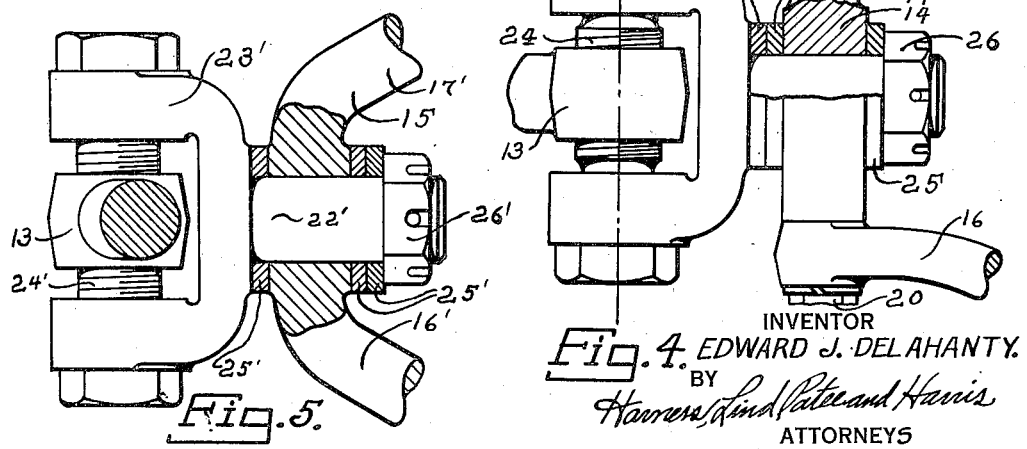
Fig. 4 is a similar view illustrating the position of a wheel after adjustment.
Fig. 5 is a detail plan view of the lower connector, modified from the Fig. 1 illustration to show my adjusting means associated with the lower connector.

In operation of the adjusting means, when it is desired to adjust or vary the camber of one of the wheels B, for example, I have illustrated such adjustment in Figs. 3 and 4. Assuming that it is desired to increase the camber of the wheel illustrated in Fig. 3, one or more of the shims 25 between nut 26 and connector 14 are removed and the same may be inserted or interposed between member 23 and connector 14 as illustrated in Fig. 4, nut 26 being restored in position. It will be noted that such adjustment results in shifting the member 23 outwardly for the distance corresponding to the thickness of the shim or shims transposed, the connector 14 being in effect lengthened so as to swing the upper end of the arm 13 about its lower pivot pin 24' to increase the camber of the wheel. Obviously, any number of shims may be added to or removed from either side of connector 14 for inceasing or decreasing the distance between frame A and the upper end of arm 13 with resulting variation in the wheel camber.

While the wheel camber may be varied by my adjusting means associated with either the upper connector 14, as in Fig. 3, or the lower connector 15, as in Fig. 5, such adjusting means may, if desired, be associated with both of these connectors. Such arrangement will be desirable in varying the wheel track or the distance of a wheel laterally from the frame without disturbing an existing camber or in combination with a lateral shifting of the wheel and a camber variation. The addition, removal, or shifting of one or more shims will readily permit any desired wheel adjustment of the general character described. I have therefore provided for selective lateral displacement of the ends of arm 13, this displacement or adjustment being progressively selective since either arm end may, in effect, be adjusted from any previous condition of adjustment of either the same or the other arm end.

I have not illustrated my suspension and adjusting means for the rear driving wheels of the vehicle as such parts may be of any desired well known form, or they may be suspended according to the teachings of my invention. In the latter instance, the king pins and swiveling structure of the front wheels will be omitted, as will be readily understood.

I have furthermore not shown or described the steering or braking mechanism for the wheels, as such devices are well known in the art and form no part per se of this invention.

I desire to point out that various modifications and changes will be apparent from the teachings of my invention and I do not limit my invention in its broader aspects to the particular combination and arrangement of parts which I have shown by way of example.

What I claim is:

1. In a vehicle wheel suspension, a wheel supporting structure, an arm swivelly mounting said wheel supporting structure, wheel displacement guiding means including a connector having arms diverging toward the vehicle frame, means pivotally connecting said arms to said frame, an adjustable member pivotally connected to said first arm and extending transversely of said connector, and adjusting means selectively associated with said adjustable member on opposite sides of said connector.

2. In a vehicle wheel suspension, a wheel supporting structure, an arm swivelly mounting said wheel supporting structure, wheel displacement guiding means including a connector having arms diverging toward the vehicle frame, means pivotally connecting said arms to said frame, an adjustable member pivotally connected to said first arm and extending transversely of said connector, and adjusting means selectively associated with said adjustable member on opposite sides of said connector, said adjusting means including one or more shims.

3. In a vehicle wheel suspension, a wheel supporting structure, an arm swivelly mounting said wheel supporting structure, wheel displacement guiding means connecting said arm to the vehicle frame for guiding rising and falling movements of the wheel, said wheel displacement guiding means including a pair of elements one of which extends transversely of the other for adjustment relative thereto, and adjusting means selectively associated with said transversely extending element on opposite sides of said connector.

EDWARD J. DELAHANTY.